UNITED STATES PATENT OFFICE.

HERMANN FRIEDMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

DYES OF THE ANTHRAQUINONE SERIES.

1,065,440.   Specification of Letters Patent.   Patented June 24, 1913.

No Drawing.   Application filed January 13, 1913.   Serial No. 741,790.

*To all whom it may concern:*

Be it known that I, HERMANN FRIEDMANN, doctor of philosophy, chemist, citizen of the German Empire, residing at Elberfeld, Germany, have invented new and useful Improvements in New Dyes of the Anthraquinone Series, of which the following is a specification.

I have found that ortho-diaminoanthraquinones, which may be substituted in one amino group, can be converted into new and valuable nitrogenous, well characterized and very stable azimino compounds by treating them with nitrous acid. The reaction proceeds according to the following equation:

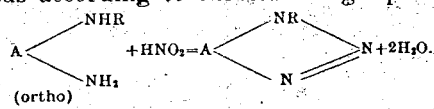

(R meaning H, alkyl, aryl, etc.) The azimino compounds are from yellow to blue to green compounds soluble in concentrated sulfuric acid generally with a yellow coloration. By treatment with sulfonating agents they are converted into sulfonic acids dyeing wool. The halogenized products can be condensed with aminoanthraquinones, valuable vat dyes being obtained.

In order to illustrate the new process more fully the following example is given, the parts being by weight:—5 parts of 1-paratolylamino-2-amino-3-bromoanthraquinone are dissolved in 50 parts of glacial acetic acid with the addition of 5 parts of sulfuric acid (60° Bé.) Then a solution of 2 parts of sodium nitrite in 6 parts of water is added at 0–10° C. After a short time the red solution has turned colorless. The azimid separates in small yellow needles. They are filtered off and recrystallized from nitrobenzene. Thus long yellow needles are obtained, which are dissolved by concentrated sulfuric acid and organic solvents with a yellow color. The reaction proceeds most probably in accordance with the following equation:

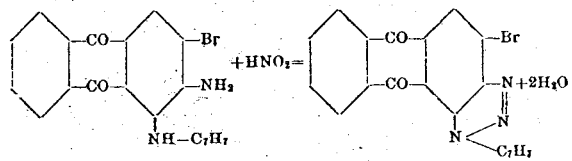

The dyestuff dyes cotton in the hydrosulfite vat yellow shades. The sulfonic acid (obtained by sulfonating) dyes wool in an acid bath in yellow shades.

Analogous azimids are obtained from other ortho-diaminoanthraquinones, such as 1.2- or 2.3-diaminoanthraquinone or from derivatives which are still substituted by auxochromic groups or such ones which are capable of entering into reaction. The 1.5-di-para-tolylamino-2.6-diamino-3.7-dibromoanthraquinone e. g. yields a brown, the 1.2-diamino-4-paratolylaminoanthraquinone and the 1.2.5.6-tetramino-4.8-di-para-tolylaminoanthraquinone yields blue to green colored azimids. Part of the resulting products are also valuable intermediate compounds for producing vat dyes e. g. by condensing them with aminoanthraquinones e. g. in the following way: 40.7 parts of the azimid obtained from 1-tolylamino-2-amino-3-bromoanthraquinone (by treating it with nitrous acid) and 22.3 parts of 1-aminoanthraquinone are heated to boiling for 2 hours with the addition of 20 parts of sodium acetate and 2 parts of cupric acetate in 400 parts of nitrobenzene. After being cooled a well crystallized substance separates, which is filtered off and washed with alkali and water. The new dyestuff is dissolved in hot solvents of a high boiling point e. g. nitrobenzene with an orange color and is separated therefrom well crystallized by cooling. In concentrated sulfuric acid the substance is dissolved with a dark blue coloration. It yields with alkali hydrosulfite a red-brown vat, from which cotton is dyed in scarlet-red shades. The reaction proceeds most probably in accordance with the following equation:

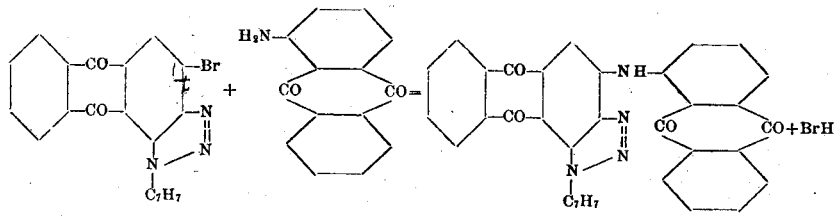

Analogous products are obtained by condensing the azimid obtained from 1-tolylamino-2-amino-3-bromoanthraquinone with substituted aminoanthraquinones. Thus with 1-amino-6-chloroanthraquinone an alizarin-red, with 1-amino-4-benzoylaminoanthraquinone or with 1-amino-4-methoxyanthraquinone a bordeaux, with 1-amino-4-anthrapyridone a blue-red vat dyestuff is obtained.

I claim:—

1. The new aziminoanthraquinones derivable from orthodiaminoanthraquinones by treating these compounds with nitrous acid, which are from yellow to blue to green compounds soluble in concentrated sulfuric acid generally with a yellow coloration; being converted into wool dyes by treatment with sulfonating agents, substantially as described.

2. The new aziminoanthraquinone having most probably the formula:

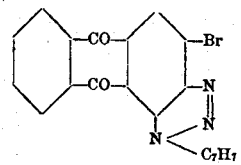

crystallizing from nitrobenzene in yellow needles, soluble in concentrated sulfuric acid with a yellow coloration; dyeing cotton from the hydrosulfite vat yellow shades; its sulfonic acid dyeing wool yellow shades; yielding by condensation with 1-aminoanthraquinone a product which dyes cotton from the hydrosulfite vat scarlet-red shades, substantially as described.

In testimony whereof I have hereunto set my hand in the presence of two subscribing witnesses.

HERMANN FRIEDMANN. [L. S.]

Witnesses:
 DORA NUFER,
 ALBERT NUFER.